United States Patent Office 3,766,195
Patented Oct. 16, 1973

3,766,195
POLYCHLORO DERIVATIVES OF DICARBOXY PYRIDINES
Russel M. Bimber, Painesville, and Paul H. Schuldt, Mentor, Ohio, assignors to Diamond Shamrock Corporation, Cleveland, Ohio
No Drawing. Original application July 9, 1969, Ser. No. 840,484, now Patent No. 3,637,716, dated Jan. 25, 1972. Divided and this application Aug. 9, 1971, Ser. No. 170,282
Int. Cl. C07d 31/36
U.S. Cl. 260—295 R   10 Claims

ABSTRACT OF THE DISCLOSURE

Novel polychloro derivatives of monocarboxy and dicarboxy pyridines and their amino derivatives, their methods of preparation and utilization as pesticides and intermediates are disclosed.

CROSS-REFERENCE TO RELATED APPLICATIONS

This application is a divisional application of Ser. No. 840,484, Russel M. Bimber et al., filed July 9, 1969, now U.S. Pat. No. 3,637,716.

FIELD OF THE INVENTION

This invention relates to new compositions of matter and methods for their preparation, and more particularly to a class of novel chemical compounds useful as pesticides and as chemical intermediates.

SUMMARY OF THE INVENTION

This invention presents novel compositions of substituted pyridines of the general formula

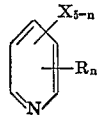

where X is halogen, $n$ is an integer of one to three and R is selected from among like or unlike radicals of the carboxylate group including acids, acid chlorides, salts and esters, thereof, or an amino radical with the provision that $n$ is greater than one when an R is in the 4-position, and with the provision that when an amino group is in the 4-position and $n$ is two, a carboxylate group is not in the 2-position. The invention also includes novel methods of preparing these compositions and their utilization as chemical intermediates and as pesticides.

From the foregoing discussion, it is a principal object of this invention to provide a new, more economical intermediate for the synthesis of amino-substituted chlorinated picolinic acids.

An additional object of this invention is to provide novel compounds useful as flame retardant additives in paint and plastic formulations and as chemical intermediates for new and improved pesticides, herbicides, plant growth regulants, flame retardant (ester) solvents, dye assistants, polyester and polyamide plastics, etc.

Other objects and properties of these substituted pyridines will become apparent from the following discussion, the included examples and the appended claims.

DESCRIPTION OF THE PREFERRED EMBODIMENTS

The novel compounds of this invention are substituted pyridines of the formula

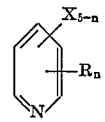

where X is halogen, $n$ is an integer of one to three and R is selected from among like or unlike radicals of the carboxylate group including acids, acid chlorides, salts and esters thereof or an amino radical, with the provision that $n$ is greater than one when an R is in the 4-position, and with the provision that when an amino group is in the 4-position and $n$ is two, a carboxylate group is not in the 2-position. Thus these compounds are pyridines in which all of the nuclear hydrogen atoms have been replaced by chlorine atoms or R groups as defined above and can be variously designated as polychloropyridine mono- and dicarboxylic acids, and derivatives thereof.

The following are illustrative of the compounds of this invention:

Tetrachloronicotinic acid

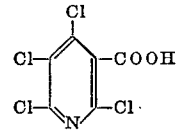

Tetrachloropicolinic acid

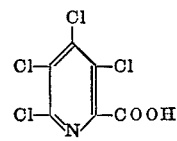

Trichlorolutidinic acid

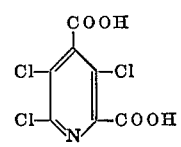

Methyl tetrachloropicolinate

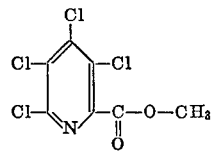

Monoammonium trichlorodipicolinate

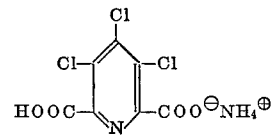

3,766,195

| 3 | | 4 |
|---|---|---|
| Dimethyl trichlorodipicolinate 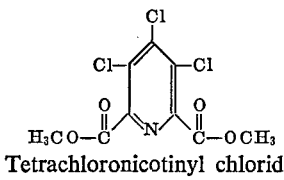 | 5 | 2-Aminotrichloroisonicotinic acid 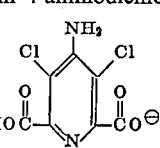 |
| Tetrachloronicotinyl chloride 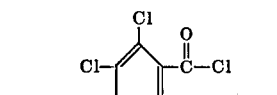 | 10 | 4-Aminotrichloronicotinic acid 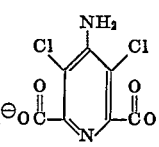 |
| Methyl tetrachloronicotinate 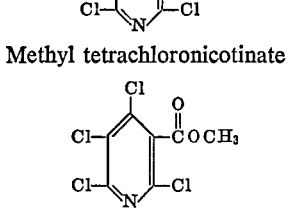 | 15 | Potassium 4-aminotrichloronicotinate 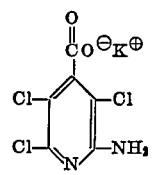 |
| Potassium tetrachloropicolinate 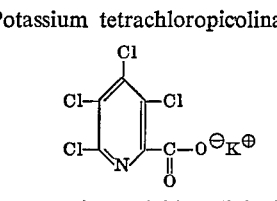 | 20 | |
| Monopotassium trichlorodipicolinate 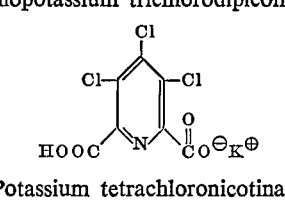 | 25, 30 | Monopotassium trichlorodinicotinate 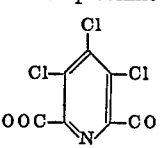 |
| | | 4-Aminodichlorodipicolinic acid 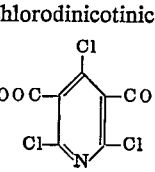 |
| Potassium tetrachloronicotinate 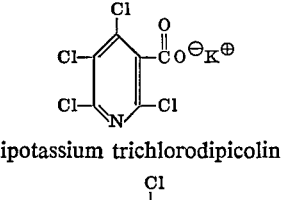 | 35 | |
| Dipotassium trichlorodipicolinate 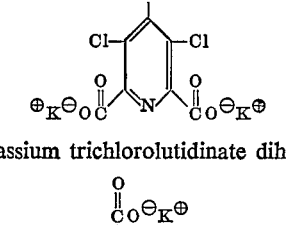 | 40 | Monopotassium 4-aminodichlorodipicolinate 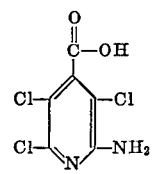 |
| | 45 | Dipotassium 4-aminodichlorodipicolinate 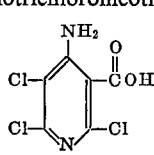 |
| Dipotassium trichlorolutidinate dihydrate 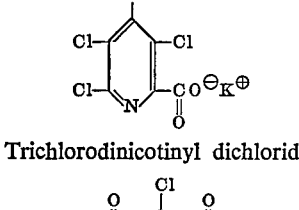 .2H₂O | 50, 55 | Potassium 2-aminotrichloroisonicotinate 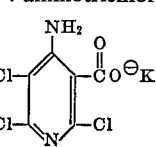 |
| Trichlorodinicotinyl dichloride 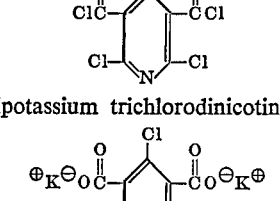 | 60 | Trichlorodipicolinic acid 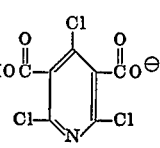 |
| Dipotassium trichlorodinicotinate 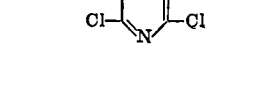 | 65, 70 | Trichlorodinicotinic acid 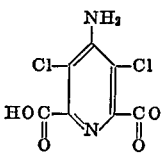 |
| | 75 | |

As used in the specification and claims, the terms "pesticide" and "pesticidal" are intended to refer to the killing and/or control of organisms and plants, such as insects, weeds, nematodes, microorganisms, fungi or the like. Thus it will be appreciated that applications of these compounds are commonly termed herbicidal, insecticidal, fungicidal, nematocidal or the like.

While it is possible to apply the compounds in undiluted form to the locus to be protected or the pest to be eradicated, it is frequently desirable to apply them in admixture with either solid or liquid inert adjuvants. Thus, they can be applied to the plants for fungicidal purposes, for example, by spraying the plants with aqueous or organic solvent dispersions of the compound. Similarly, wood surfaces can be protected by applying a protective film of the compound by brushing, spraying or dipping, utilizing a liquid dispersion of the compound. The choice of an appropriate solvent is determined largely by the concentration of active ingredient which it is desired to employ, by the volatility required in a solvent, the cost of the solvent and the nature of the material being treated. Among the many suitable organic solvents which can be employed as carriers for the present pesticides, there may be mentioned hydrocarbons such as benzene, toluene, xylene, kerosene, diesel oil, fuel oil, and petroleum naphtha; ketones such as acetone, methyl ethyl ketone and cyclohexanone; chlorinated hydrocarbons such as carbon tetrachloride, chloroform, trichloroethylene and perchloroethylene; esters such as ethyl acetate, amyl acetate and butyl acetate; the monoalkyl ethers of ethylene and diethylene glycol, e.g., the monomethyl or monoethyl esters; alcohols such as ethanol, isopropanol and amyl alcohol; and the like.

The pesticidal compounds can also be applied to plants and other materials along with inert solid adjuvants or carriers such as talc, pyrrophyllite, attapulgite, kieselguhr, chalk, diatomaceous earth, lime, calcium carbonate, bentonite, kaolinite, cottonseed hulls, wheat flour, soybean flour, pumice, tripoli, wood flour, walnut shell flour and lignin.

It is frequently desirable to incorporate a surface active agent in the pesticidal compositions of this invention. Such surface active agents are advantageously employed in both the solid and liquid compositions. The surface active agent can be anionic, cationic or nonionic in character.

Typical classes of surface active agents include alkyl sulfonates, alkylaryl sulfonates, alkyl sulfates, alkylamide sulfonates, alkylaryl polyether alcohols, fatty acid esters of polyhydric alcohols, ethylene oxide addition products of such esters, addition products of long chain mercaptans and ethylene oxide, sodium alkyl benzene sulfonates having 14 to 18 carbon atoms, alkylphenolethylene oxides, e.g., p-isooctylphenol condensed with 10 ethylene oxide units; and soaps, e.g., sodium stearate and sodium oleate.

The solid and liquid formulations can be prepared by any suitable method. Thus, the active ingredients, in finely divided form if a solid, may be tumbled together with finely divided solid carrier. Alternatively, the active ingredient in liquid form, including solutions, dispersions, emulsions, and suspensions thereof, may be admixed with the finely divided solid carrier in amounts small enough to preserve the free-flowing property of the final dust composition.

When solid compositions are employed, in order to obtain a high degree of coverage with a minimum dosage of the formulation, it is desirable that the formulation be in finely divided form. The dust containing active ingredient usually should be sufficiently fine that substantially all will pass through a 20-mesh Tyler sieve. A dust which passes through a 200-mesh Tyler sieve also is satisfactory.

For dusting purposes, preferably formulations are employed in which the active ingredient is present in an amount of 5 to 50% of the total by weight. However, concentrations outside this range are operative and compositions containing from 0.1 to 99% of active ingredient by weight are contemplated, the remainder being carrier and/or any other additive or adjuvant which may be desired. It is often advantageous to add small percentages of surface active agents, e.g., 0.1 to 1% of the total composition by weight, to dust formulations.

For spray applications, the active ingredient may be dissolved or dispersed in a liquid carrier, such as water or other suitable liquid. The active ingredient can be in the form of a solution, suspension, dispersion or emulsion in aqueous or nonaqueous medium. Desirably, 0.5 to 1.0% by weight of a surface active agent is included in the liquid composition.

For adjuvant purposes, any desired quantity of surface active agent may be employed, such as up to 250% of the active ingredient by weight. If the surface active agent is used only to impart wetting qualities, for example, to the spray solution, as little as 0.05% by weight or less of the spray solution need be employed. The use of larger amounts of surface active agent is not based upon wetting properties but is a function of the physiological behavior of the surface active agent. These considerations are particularly applicable in the case of the treatment of plants. In liquid formulations the active ingredient often constitutes not over 30% by weight of the total and can be 10%, or even as low as 0.01%.

The pesticidal compounds of the present invention can be employed in compositions containing other pesticides, more especially fungicides, insecticides, and bactericides, e.g., tetrachloroisophthalonitrile, pyrethrum rotenone, DDT, etc.

Some of the foregoing novel compounds are prepared in general by hydrolysis of the corresponding nitriles, the perchlorinated monomethylpyridines or perchlorinated dimethylpyridines. The hydrolysis can be with or without the advantage of a catalytic aid with the preferred catalytic aid being an acidified aqueous solution with an especially preferred catalytic aid being a warm 80% sulfuric acid solution. The hydrolysis step can also be assisted by employing heat and/or application of pressure between 20° to 200° C. and 0 to 200 pounds per square inch gauge. Atmospheric or autogeneous pressure is normally employed, but pressurizing (e.g., with carbon dioxide) to suppress decarboxylation is beneficial in some cases. The resulting precipitates of colorless solids are the novel chlorinated pyridines of this invention.

Another method of preparing the carboxypolychloropyridine compounds is by heating the corresponding mono- or dicyanopolychloropyridino in aqueous 80% sulfuric acid until dissolved and then diluting the solution with ice water to derive the colorless solid precipitate of the corresponding carboxypolychloropyridine. The appropriate cyanopolychloropyridines are known along with their preparation as set forth in U.S. Pat. 3,325,503, the disclosure of which is incorporated herein by reference.

The common mineral acids suffice to produce the acidification desired for the hydrolysis preparation of the polychloropicolinic acids. Typical acids producing the desired acidification include the mineral acids such as hydrochloric acid, sulfuric acid, and phosphoric acid. While any proportions of the corresponding cyanopolychloropyridine and water (with acidic catalytic aid) can be reacted, it is preferred that an excess of water be employed in the reaction because this insures completion of the reaction. It is envisioned that the instant invention can be conducted in a batch-type process when the initial reactants are added to the reaction chamber and are reacted under the desired conditions until the reaction stops with subsequent separation of the reaction products. However, the best advantages of the instant invention will be achieved in a reactor designed to have continuous reaction by coordinated addition of controlled amounts of the reactants (the appropriate cyanopolychloropyridines and an aqueous mineral acid) with coordinated withdrawal of the reaction products.

It has also been discovered that the novel, chlorinated monocarboxy and dicarboxy pyridines of the instant invention are especially useful intermediates in the preparation of aminopolychloropyridine carboxylic acids. In general, the preparation of the appropriate aminopolychloropyridine carboxylic acids is achieved by subjecting the corresponding polychloropyridine carboxylic acid to an amination step with use of heat and/or pressure, followed by acidification which yields a colorless precipitate. For convenience of reaction, an ammonia solution in water is usually employed at an appropriate temperature range, e.g., 20° to 200° C., and a pressure range of 0 to 200 pounds per square inch gauge. When the reactions are conducted at elevated temperatures in closed systems, the autogeneous pressure is adequate and no applied pressure is required.

Aminopolychloropyridine carboxylic acids and derivatives thereof may also be prepared by reacting polychlorocyanopyridines with aqueous ammonia to effect both hydrolysis of the nitrile group and replacement of chlorine in a single operation. The reaction mixture may be evaporated to yield the ammonium salt, acidified with a mineral acid to obtain the desired acid, or treated in conventional ways to obtain other salts, esters, etc.

When salts of the polychloropyridine carboxylic acids or aminopolychloropyridine carboxylic acids are desired, the foregoing process may be modified so that the acid hydrolysis step is replaced with an alkaline hydrolysis step, using the hydroxide of the desired cation to make the salt of polychloropyridine carboxylic acid or aminopolychloropyridine carboxylic acid. For convenience, an aqueous solution of the base is usually employed. The appropriate bases and their corresponding cations employed are potassium hydroxide (potassium), sodium hydroxide (sodium), lithium hydroxide (lithium), ammonium hydroxide (ammonium), etc. Careful control of the reaction conditions is required in some cases to avoid replacing some of the chlorine atoms by amino or hydroxyl groups.

The preparation of the aminopolychloropyridine dicarboxylic acids or appropriate salts of aminopolychloropyridine dicarboxylic acids from the polychloropyridine dicarboxylic acids of this invention is envisioned as possible to be conducted in batch-type processes wherein the initial reactants are added to the reaction chamber and reacted under the desired conditions until the reaction stops, with the subsequent separation of the reaction products. However, the best advantages of the instant invention will be achieved in a reactor designed to have continuous reaction by coordinated addition of controlled amounts of reactants with coordinated withdrawal of the reaction products.

In order that those skilled in the art may more completely understand the present inention and the preferred methods by which the same may be carried into effect, the following examples are offered in which identification of all compounds was done by infrared spectroscopy and partial elemental analysis.

Example 1

Preparation of tetrachloropicolinic acid from 2-cyanotetrachloropyridine.—About 0.5 gram of 2-cyanotetrachloropyridine is added to 50 ml. of warm 80% aqueous sulfuric acid in a Pyrex flask and heated on a steam bath for 3 hours and 45 minutes, giving a clear colorless solution. Stirring this into excess ice precipitated a colorless solid which was filtered off, rinsed with distilled water and air dried overnight. The resulting product melted at 179° to 180° C. with evolution of gas. This solid was identified as 2 - carboxytetrachloropyridine (or tetrachloropicolinic acid) as shown by conversion to 4-aminotrichloropicolinic acid and comparison of an infrared spectrum of this product with an infrared spectrum of a known sample of 4-aminotrichloropicolinic acid. Analytical data gave 54.2% chlorine and 5.7% nitrogen compared to a calculated 54.4% chlorine and 5.4% nitrogen.

Examples 2–5

Preparation of polychloropyridine mono- and dicarboxylic acids from corresponding polychlorocyanopyridines.—Using the equipment and procedure described in Example 1, the polychlorocyanopyridines, 3-cyanotetrachloropyridine, 2,4-dicyanotrichloropyridine, 2,6-dicyanotrichloropyridine and 3,5 - dicyanotrichloropyridine, were added to 5 to 10 parts by weight of an aqueous 80% sulfuric acid solution and heated near 100° C. until dissolved (2 to 28 hours). The product is precipitated by pouring the solution into ice water. It is filtered, rinsed and dried as practiced in Example 1. The products were identified by infrared spectroscopic analysis and chlorine determinations. Table 1 sets forth the result of these preparations.

TABLE 1

| Example | Reactants | Product | Melting point of product, °C. | Percent chlorine content Found | Percent chlorine content Calculated |
|---|---|---|---|---|---|
| 2 | 3-cyanotetrachloropyridine and 80% aqueous sulfuric acid | Tetrachloronicotinic acid | 174.5–176 | 54.2 | 54.4 |
| 3 | 2,4-dicyanotrichloropyridine and 80% aqueous sulfuric acid | Trichlorolutidinic acid | 208–210 | 39.5 | 39.3 |
| 4 | 2,6-dicyanotrichloropyridine and 80% aqueous sulfuric acid | Trichlorodipicolinic acid | 167–168 | 39.7 | 39.3 |
| 5 | 3,5-dicyanotrichloropyridine and 80% aqueous sulfuric acid | Trichlorodinicotinic acid | 265–266 | 38.4 | 39.3 |

Example 6

Preparation of methyl tetrachloropicolinate.—A solution of 0.1 mole of ammonium tetrachloropicolinate, prepared by hydrolyzing tetrachloro - 2 - cyanopyridine with aqueous ammonia and evaporating the water, in 300 ml. of refluxing methanol was saturated with hydrogen chloride gas for five hours. The solution was cooled, and the product filtered. The product was purified by rinsing with distilled water producing a 41.8% yield of pure methyl tetrachloropicolinate. Partial elemental analysis showed 30.6% carbon and 1.1% hydrogen agreeing with the calculated percent carbon and hydrogen with a melting point of 65.5–67° C.

Example 7

Preparation of dimethyl trichlorodipicolinate.—The procedure in Example 6 was followed with substitution of ammonium trichlorodipicolinate from the ammonium tetrachloropicolinate used in Example 6 and recrystallization from hexane instead of washing with distilled water to give a 67.1% yield of pure dimethyl trichlorodipicolinate. Analysis gave 36.3% carbon and 2.2% hydrogen compared with a calculated theoretical 36.2% carbon and 2.0% hydrogen, melting at 75–76° C.

Example 8

Preparation of monoammonium trichlorodipicolinate.—A solution of 0.027 mole of trichlorodipicolinic acid and 150 ml. of aqueous ammonia was heated at 90–100° C. in a pressure bottle on a steam bath for two hours. The product was dissolved in a dilute ammonium hydroxide solution, precipitated with concentrated hydrochloric acid and washed with water, yielding 85% pure monoammonium trichlorodipicolinate, melting at 226–228° C. Analytical data gave 29.0% carbon, 1.9% hydrogen and 37.8% chlorine with calculated theoretical carbon being 29.2%, hydrogen 1.8% and chlorine 37.0%,

Example 9

Preparation of 2 - aminotrichloroisonicotinic acid.—Using the procedure of Example 8, 0.027 mole of tetrachloroisonicotinic acid was substituted for the trichlorodipicolinic acid of Example 8 with heating in an autoclave at around 100° C. and a pressure of 110 pounds per square inch for 18 hours with the same purification technique, yielding 58.2% pure 2-aminotrichloroisonicotinic acid, melting at 247–248° C. Ananlytical data gave:

Calculated for $C_6H_3Cl_3N_2O_2$ (percent): Chlorine, 44.0 and nitrogen, 11.6. Found (percent): Chlorine, 44.1 and nitrogen, 11.5.

Example 10

Preparation of 4-aminotrichloronicotinic acid.—Otherwise following the procedure of Example 8, 0.027 mole of tetrachloronicotinic acid was substituted for the trichlorodipicolinic acid of Example 8 with heaitng in an autoclave at around 120° C. for 18 hours at 130–149 p.s.i. pressure with the same purification technique, yielding 51.7% pure 4-aminotrichloronicotinic acid, melting at 188–190° C. Analytical data gave 44.0% chlorine and 11.6% nitrogen with the theoretical calculated at 44.1% chlorine and 11.6% nitrogen for this compound.

Example 11

Preparation of 4-aminodichlorodipicolinic acid.—Using the procedure of Example 8, but heating for 17 hours rather than 2 hours, 0.027 mole of trichlorodipicolinic acid was converted, at 110 p.s.i. pressure, to 64.6% pure 4-aminodichlorodipicolinic acid, melting at 185–186° C. Analytical data showed 27.4% chlorine and 11.3% nitrogen present and a theoretical calculation of 28.2% chlorine and 11.2 nitrogen.

Example 12

Preparation of tetrachloronicotinyl chloride.—A mixture of 0.1 mole of tetrachloronicotinic acid, 100 ml. of thionyl chloride and 5 ml. of dimethyl formamide was heated in refluxing carbon tetrachloride for three hours. The reaction mixture was filtered while hot and the carbon tetrachloride and excess thionyl chloride were stripped off. The product was recrystallized from petroleum ether giving a yield of 62.2% pure tetrachloronicotinyl chloride, melting at 54–56° C. Analytical data gave 62.5% chlorine present compared to a calculated theoretical 63.5% chlorine.

Example 13

Preparation of trichlorodinicotinyl chloride.—The same procedure used in Example 12 was practiced here with substitution of trichlorodinicotinic acid for the tetrachloronicotinic acid used in Example 12, giving a yield of 60.6% pure trchlorodinicotinyl chloride, melting at 61–62.5° C. Analytical data gave 57.2% chlorine compared with a calculated theoretical 57.7% chlorine.

Example 14

Preparation of methyl tetrachloronicotinate.—A solution of 0.05 mole of tetrachloronicotinyl chloride in methanol was added dropwise to a solution containing 0.05 mole of sodium methylate and methanol. The reaction was heated at about 65° C. for two hours. The reaction mixture was poured into water, filtered and the product was recrystallized from hexane, yielding 36% pure methyl tetrachloronicotinate, melting at 72–73.5° C. Analytical data is:

Calculated for $C_7H_3Cl_4NO$: 30.6% carbon and 1.1% hydrogen. Found: 30.4% carbon and 1.3% hydrogen.

Examples 15–25

Additional compounds were prepared by reacting a different precursor listed for each new compound in the following table and one or two equivalent weights of potassium hydroxide and around 30 ml. of water, all being charged into a 125 ml. flask. The mixture was heated to dissolve the solids and then the insolubles were filtered off. The water was evaporated from the filtrate and the residue was oven dried under vacuum. Table 2 sets forth these preparations with the first column being the example numbers, the second column listing the precursors, the third column listing the product, the fourth column being the melting point of the product, and the fifth column presenting the analytical data for each compound.

TABLE 2

| Example | Reactants | Product | Melting point of product, ° C. | Percent chlorine Found | Percent chlorine Calculated |
|---|---|---|---|---|---|
| 15 | Tetrachloropicolinic acid and 1 equivalent of KOH | Potassium tetrachloropicolinate | >360 | 46.6 | 47.4 |
| 16 | Trichlorodipicolinic acid and 1 equivalent of KOH | Monopotassium trichloredipicolinate | >360 | 35.4 | 34.5 |
| 17 | Tetrachloronicotinic acid and 1 equivalent of KOH | Potassium tetrachloronicotinate | 325–329 | 46.5 | 47.4 |
| 18 | Trichlorodipicolinic acid and 2 equivalents of KOH | Dipotassium trichlorodipicolinate | >360 | 30.0 | 30.7 |
| 19 | Trichlorolutidinic acid and 2 equivalents of KOH | Dipotassium trichlorolutidinate dihydrate | ~300 | 27.5 | 27.8 |
| 20 | Trichlorodinicotinic acid and 2 equivalents of KOH | Dipotassium trichlorodinicotinate | (¹) | 29.9 | 30.7 |
| 21 | 4-aminotrichloronicotinic acid and 1 equivalent of KOH | Potassium 4-aminotrichloronictotinate | >360 | 36.8 | 38.0 |
| 22 | Trichlorodinicotinic acid and 1 equivalent of KOH | Monopotassium trichlorodinicotinate | >360 | 34.7 | 34.5 |
| 23 | 4-aminodichlorodipicolinic acid and 1 equivalent of KOH | Monopotassium 4-aminodichlorodipicolinate | >360 | 25.0 | 24.5 |
| 24 | 2-aminotrichloroisonicotinic acid and 1 equivalent of KOH | Potassium 2-aminotrichloroisonicotinate | 320 | 38.1 | 38.0 |
| 25 | 4-aminodichlorodipicolinic acid and 2 equivalents of KOH | Dipotassium 4-aminodichlorodipicolinate | >360 | 20.8 | 21.7 |

¹ Decomposes at 330° C.

Example 26

Red spider mite spray plus systemic test.—This test determines the insecticidal activity of the compound being tested against the red spider mite, Tetranychus sp. A test formulation containing 0.1 g. of the test chemical (or 0.1 ml. if a liquid), 4.0 ml. acetone, 2.0 ml. stock emulsifier solution (0.5% Triton X–155 in water by volume), and 94.0 ml. distilled water is prepared for both the drench and spray treatments. The stock culture of mites is maintained on Scarlet runner bean foliage. Approximately 18 to 24 hours before testing, mites are transferred from the stock culture on pieces of infested leaves which are placed on the primary leaves of two lima bean plants (var. Sieva) grown in 2½-inch pots. As leaf fragments dry, the mites migrate to the uninfested leaves. Immediately before drenching and spraying, the leaf fragments are ermoved from the foliage.

For spray application, 50 ml. of the test formulation is sprayed by means of a De Vilbiss paint spray gun (Type CH), calibrated ot deliver 45 ml. water in 30 seconds at 30 pounds air pressure per square inch, while the plants are being rotated on a turntable in a hood. After three days, two of the four leaves treated are examined under a binocular steroscopic microscope and the mortality determined. Using this procedure, the following results are obtained:

Compound: Trichlorodinicotinyl chloride:
 Dosage p.p.m. _____ 500
 Percent mortality mite spray _____ 75

Example 27

Housefly spray test.—This test determines the insecticidal activity of the compound being tested against adult houseflies, *Musca domestica*.

The formulation for this test contains 0.1 g. of test chemical (or 0.1 ml., if a liquid); 4.0 ml. acetone, 2.0 ml. stock emulsifier solution (0.5% Triton X–155 in water by volume) and 94.0 ml. distilled water. The concentration of toxicant in this formulation is 1000 p.p.m., with lower concentrations being obtained by diluting the formulation with distilled water.

Cages consisting of cylindrical screens 1½ inches in diameter by 4 inches long are fabricated from 20-mesh stainless steel screening. One end is closed with a size D polyurethane foam tube plug. Ten adult houseflies (male and female), anesthetized with carbon dioxide, are counted into each cage, and the open end is then closed with a second foam plug. The cages are inserted into a wire stand mounted on the turntable in the spray hood and the insects are sprayed with 50 ml. of the formulation. The flies are supplied a dextrose solution by draping a paper wick over the outside of the screen cylinder. They are able to feed and drink by passing their probosci through the openings in the screen. Mortality data are recorded three days after treatment. Results of insecticidal activity are given in the following table:

Compound tested trichlorodinocotinyl chloride:
Concentration p.p.m. _____ 500
Percent mortality _____ 40

(a) Tomato—three to five inches tall;
(b) Bean—the first trifoliate leaf begins to unfold;
(c) Corn—four to six inches tall;
(d) Oats—three to five inches tall.

In the soil drench treatment the soil surface of each pot (tomato, bean, corn, and oats) is drenched with 17.5 ml. of the test compound, resulting in an application of 64 pounds per acre with dilution to give the lower concentrations tested. The four pots are then sprayed simultaneously with the remaining 80 ml. of formulation on a rotating turntable in a hood at 40 p.s.i. This foliage spray contains 2400 p.p.m. of chemical or about two pounds of active chemical per 100 gallons of water solution with dilution to give the lower concentrations tested. After the plant foliage dries, the plants are placed in the greenhouse. The results are recorded fourteen days after treatment. Phytotoxicity is rated on the scale from 0, indicating no plant injury, to 11, plant kill and, additionally, stunting of the plant is rated on a scale of 1-slight to 9-severe. Chemicals found to give a phytotoxicity rating of 10 or more or a stunting rating of 9 on one or more of the test species are retested at lower rates. On retesting, the soil drench and foliage spray treatments are carried out as separate tests. Only those species on which suitable ratings were obtained for phytotoxicity or stunting or both are retained for testing at lower dosages and the remaining species are dropped from further testing. Other responses such as formative effects (Fe), defoliant activity (Da), growth-regulant properties, and chlorosis (Ch) are recorded. Using this procedure, the following results are obtained:

TABLE 3

| Compound | Dosage | | Phytotoxicity and other effects | | | | | | | |
|---|---|---|---|---|---|---|---|---|---|---|
| | | | Soil watering | | | | Foliage spray | | | |
| | Lbs./a. | P.p.m. | To | Be | Co | Oa | To | Be | Co | Oa |
| Tetrachloropicolinic acid | 64 | 2,400 | 5Fe | 4s9 | | | 5Fe | 4s9 | | |
| Methyl tetrachloropincolinate | 64 | 2,400 | 9Fe | 8s9 | | | 9Fe | 8s9 | | |
| Monoammonium trichlorodipicolinate | | 150 | | | | | 11 | 10Fe | 2 | 3 |
| Potassium tetrachloropicolinate | 64 | 2,400 | 5Fe | 4s9 | 0 | 0 | 5Fe | 4s9 | 0 | 0 |
| Potassium tetrachloronicotinate | 64 | 2,400 | 0 | 0 | 0 | 5s9 | 0 | 0 | 0 | 5s9 |
| Potassium trichlorolutidinate dihydrate | 8 | 300 | | 3s7 | | | | 0 | | |
| | 4 | 150 | | 3s7 | | | | 0 | | |
| Potassium trichlorodinicotinate | 64 | 2,400 | 8Fe | 0 | 0 | 0 | 8Fe | 0 | 0 | 0 |
| 2-aminotrichloroisonicotinic acid | 64 | 2,400 | 11 | 11 | 10 | 10 | 11 | 11 | 10 | 10 |
| | 32 | 1,200 | 11 | 10s9 | 8s5 | 9s9 | 11 | 10Fe | 70F | 3s5 |
| | 16 | 600 | 11 | 10s9 | 8s5 | 8s9 | 10Fe | 10s9 | 5 | 8s5 |
| Potassium 4-aminotrichloronicotinate | 64 | 2,400 | 9s8 | 8s9 | 4 | 4 | 9s8 | 8s9 | 4 | 4 |
| 4-aminotrichloronicotinic acid | 64 | 2,400 | 9s9 | 11 | 2 | 4 | 9s9 | 11 | 2 | 4 |
| 4-aminodichlorodipicolinic acid | 64 | 2,400 | 11 | 11 | 3 | 7s9 | 11 | 11 | 3 | 7s9 |
| | 32 | 1,200 | 11 | 11 | | 7s9 | 11 | 11 | | 3s5 |
| | 16 | 600 | 11 | 11 | | 3 | 11 | 9s9 | | 9 |
| | 8 | 300 | 11 | 11 | | | 11 | 4s9 | | |
| Monopotassium 4-aminodichlorodipicolinate | 64 | 2,400 | 11 | 11 | 3 | 6 | 11 | 11 | 3 | 6 |
| | 8 | 300 | 11 | 11 | | | 11 | 11 | | |
| Potassium 2-aminotrichloroisonicotinate | 64 | 2,400 | 11 | 11 | 8Fe | 9Fe | 11 | 11 | 8Fe | 9Fe |
| | 16 | 600 | 9s9 | 10 | | | 9s9 | 9s9 | | |
| Dipotassium 4-aminodichlorodipicolinate | 64 | 2,400 | 11 | 11 | 7 | 4s9 | 11 | 11 | 7 | 4s9 |
| | 8 | 300 | 11 | 11 | | | 11 | 11 | | |
| Trichlorodipicolonic acid | [1] 64 | [1] 2,400 | | 4s9Fe | | | | 4s9Fe | | |

[1] Stunts bean plants at this concentration.

Example 28

Soil drench and post-emergence foliage spray combination.—To measure the foliage contact and soil drench herbicidal activity of compounds of this invention, a test formulation of 150 ml. is prepared for both the soil drench and foliage spray treatments. This formulation contains 0.36 g. of the test chemical (or 0.36 ml. if a liquid), 6.0 ml. acetone, 3.0 ml. stock emulsifier solution (0.5% Triton X–155 in water by volume), and 141.0 ml. distilled water.

The plants used for this test are planted in 3½ inch pots as follows:

(a) Tomato, var. Bonny Best, one plant per pot;
(b) Garden bean, var. Tendergreen, four plants per pot;
(c) Field corn, var. Cornell M–3, four plants per pot;
(d) Oats, var. Russell, 15 to 20 plants per pot.

The various test species are planted so that at treatment time they are at the following stages of growth:

Example 29

Viruscide test.—Test formulations are examined for ability to control two host virus systems, southern bean mosaic on Pinto bean and maize dwarf mosaic virus on Golden Bantam sweet corn. A test formulation containing 0.1 g. of the test chemical (or 0.1 ml. if a liquid), 4.0 ml. acetone, 2.0 ml. stock emulsifier solution (0.5% Triton X–155 in water by volume), and 94.0 ml. distilled water is prepared for both the soil drench and foliage spray treatments. Both host virus systems, southern bean mosaic on *Phaseolus vulgaris var.* Pinto and maize dwarf mosaic virus on *Zea mays* var. Golden X Bantam, are cultured in the same four-inch clay pot. Virus inoculation is made by carborundum leaf abrasion method prior to treatment.

In the foliage spray application, 33 ml. of the test formulation (1000 p.p.m. with dilution to lower concentrations) are sprayed at 40 pounds per square inch air pressure while the plants are being rotated on a turntable in a hood. Twenty-four hours after spraying, in the soil drench treatment, the test formulation is applied at the soil surface of each pot; 45 ml. of the formulation being equivalent to a dosage of the test chemical of 64 pounds per acre with lower concentrations for tests made by dilution. Effective control is determined through visual observation of the presence or absence of viral infection symptoms ten days after inoculation. Using this procedure, the following results are obtained:

| Compound | Dosage | | Percent control | | | |
|---|---|---|---|---|---|---|
| | | | Soil drench | | Foliage spray | |
| | Lbs./a. | P.p.m. | Corn | Bean | Corn | Bean |
| Potassium trichlorodinicotinate | 64 | 1,000 | 100 | | | |
| Trichlorodinicotinyl chloride | | 500 | | | 100 | |
| 2-aminotrichloroisonicotinic acid | 32 | 500 | | 100 | | 100 |
| Potassium 4-aminotrichloronicotinate | 64 | 1,000 | 100 | 100 | 100 | 100 |

Example 30

Pre- and post-emergence tests in soil, broadleaf and grass species.—This test measures the pre- and post-emergence herbicidal activity of test chemicals applied to the foliage or seedling plants, as well as to the soil in which they are growing. Seeds of six species are planted in soil contained in 9 x 9 x 2-inch aluminum cake pans filled to within ½-inch of the top with composted greenhouse soil. The seeds planted consist of three broadleaf species (buckwheat, *Fagopyrum esculentum*, turnip, *Brassica rapa*, and zinnia, *Zinnia* spp.) and three grass species (sorghum, *Sorphum vulgare*, Italian millet, *Panicum ramosum*, and perennial ryegrass, *Lolium perenne*). The soil in each pan is divided into two equal rectangular areas, and the broadleaves are seeded into one-half of one of these areas and the grasses into the other half of the same area. The seeds are then covered uniformly with about one-fourth inch of soil and watered, after which they are removed to the greenhouse and the test species are allowed to grow until one true leaf is present on the slowest broadleaf (zinnia). This requires between 7 and 14 days depending upon the time of the year. When the plants (seeedlings) have reached this stage of development, and one day prior to spraying, the other halves of the pans are planted as before, but broadleaves and grasses are reversed.

The pans are then sprayed at 10 p.s.i., uniformly covering the surface of the soil and the foliage with 40 ml. of test formulation (2080 p.p.m.) at a dosage of 16 pounds per acre. Lower concentrations tested are made by dilution. This formulation contains 0.083 g. chemical (0.08 ml. if a liquid), 20.0 ml. acetone, 2.0 ml. stock emulsifier solution (0.5% Triton X–155 in water by volume), and 18.0 ml. distilled water.

Two weeks after treatment, percent control is estimated and information on phytotoxicity, growth regulation, and other effects are recorded. Using this procedure, the following results are obtained:

| Compound | Dosage (lbs./a.) | Percent control and other effects | | | |
|---|---|---|---|---|---|
| | | Post-emergence | | Pre-emergence | |
| | | Broad leaves | Grasses | Broad leaves | Grasses |
| Methyl tetrachloropicolinate | 16 | ¹45 | 30 | | |
| | 8 | ¹35 | | | |
| | 4 | ¹35 | | | |
| Tetrachloronicotinyl chloride | 16 | 100 | 50 | | |
| | 8 | 25 | 0 | | |

¹ No turnips.

Example 31

Bean halo blight test.—Test formulations are examined for ability to control bean halo blight (*Pseudomonas phaseolicola*). A test formulation of 150 ml. is prepared for both the soil drench and foliage spray treatments. This formulation contains 0.36 gram of the test chemical, 6.0 ml. acetone, 3.0 ml. stock emulsifier solution (0.5% Triton X–155 in water by volume), and 141 ml. distilled water. The plants used for this test, Garden bean var. Tendergreen, four plants per pot, are planted in 3½-inch pots. At treatment time, the beans have reached a stage of growth such that the first trifoliate leaf begins to unfold. Two of the bean plants per pot are inoculated by injection with the bean halo blight using a hypodermic syringe. The organism is taken off a slant culture medium.

In the soil drench treatment, the soil surface of each pot is drenched with 17.5 ml. of the test compound, resulting in an application of 64 pounds per acre. The four pots are then sprayed simultaneously with the remaining 80 ml. of formulation on a rotating turntable in a hood at 40 p.s.i. This foliage spray contains 2400 p.p.m. of chemical or about two pounds of active chemical per 100 gallons of water soltuion. After the plant foliage dries, the plants are placed in the greenhouse. The results are recorded 14 days after treatment. Ratings are based on a scale of 100 percent for total control of the blight. Chemicals found to give a very high rating in the initial test are retested at lower rates. On retesting, the soil drench and foliage spray treatments are carried out as separate tests with the lower test concentrations being made by dilution. Using this procedure, the following results are obtained:

| Compound | Dosage, lbs./a. | Percent control | Dosage, p.p.m. | Percent control |
|---|---|---|---|---|
| Methyl tetrachloropicolinate | 64 | 100 | | |
| | 32 | 100 | | |
| | 16 | 100 | | |
| Monoammonium trichlorodipicolinate | 2 | 100 | 37.5 | 100 |
| | 1 | 100 | 18.1 | 100 |
| Methyl tetrachloronicotinate | 64 | 100 | 2,400 | 100 |
| | 32 | 100 | 1,200 | 100 |
| 2-aminotrichloroisonicotinic acid | 16 | 100 | 600 | 100 |
| | 8 | 100 | 300 | 100 |
| | 4 | 100 | 150 | 100 |
| 4-aminotrichloronicotinic acid | 64 | 100 | 2,400 | 100 |
| | 32 | 100 | | |
| | 16 | 100 | | |
| | 2 | 100 | 600 | 100 |
| 4-aminodichlorodipicolinic acid | 0.5 | 100 | 300 | 100 |
| | | | 150 | 100 |
| | | | 75 | 100 |

Example 32

Bactericides.—Test formulations are examined for ability to inhibit the colonial growth of *Erwinia amylovora* (E.a.), *Xanthomonas phasooli* (X.p.) *Staphylococcus aureus* (S.a.), and *Eschorochia coli* (E.c.) at various concentrations. The basic test formulation contains 0.125 g. of the test chemical (or 0.125 ml. if a liquid), 4.0 ml. acetone, 2.0 ml. stock emulsifier solution (0.5% Triton X–155 in water by volume) and 94.0 ml. distilled water, the concentration of toxicant in this formulation being 1250 parts per million. Lower concentrations of toxicant are obtained by diluting the basic formulation with distilled water.

Two ml. of each formulation is dispensed into a test tube which is then placed into a water bath maintained at 44° C. From a stock preparation (also held at 44° C.), 8 ml. of 20-percent nutrient agar is added to the test tube giving a 1:5 dilution or a final concentration of 250 p.p.m. chemical in the agar. The contents of the test tube are then thoroughly mixed, while still warm, with the aid of a Vortex type mixer and immediately poured into a sterile polystyrene Petri dish (100 x 15 mm.). After the agar in the plate is set, suspensions of each organism are simultaneously streaked onto the surface of the agar. After the plate is inoculated, it is incubated 24 to 48 hours at 30° C., after which time each organism is rated visually for growth inhibition by the candidate chemical. Estimates of percent growth inhibition are relative to growth of streak colonies in control plates obtained during individual tests. Using this procedure, the following results are obtained:

| Compound | Concentration, p.p.m. | Percent control | | | |
|---|---|---|---|---|---|
| | | E.a. | X.p. | S.a. | E.c. |
| Methyl tetrachloronicotinate | 250 | 0 | 100 | 0 | 0 |
| | 128 | 0 | 100 | 50 | 0 |

Example 33

Fungicides-foliage protectant and eradicant tests.— The tomato foliage disease test measures the ability of the test compound to protect tomato foliage against infection by the early blight fungus *Alternaria solani* (Ell. and Mart.) Jones and Grout and the late blight fungus *Phytophthora infestans* (Mont.) de Bary. The method used employs tomato plants, 5 to 7 inches high which are 4 to 6 weeks old. Duplicate plants, one set for each test fungus, are sprayed with various dosages of the test formulation at 40 lbs./sq. in. air pressure while being rotated on a turntable in a hood. The center of the turntable is 45 inches from the nozzle of the spray gun. The test formulation containing the test compound, acetone, stock emulsifier solution and distilled water is applied at concentrations up to 2000 p.p.m. of the test chemical. Lower concentrations of toxicant are obtained by employing less toxicant and more water, thereby maintaining the same concentration of acetone and emulsifier.

After the spray deposit is dry, treated plants and controls (sprayed with formulation less toxicant) are sprayed while being rotated on a turntable with a spore suspension containing approximately 20,000 conidia of *A. solani* per ml., or 150,000 sporangia of *P. infestans* per ml. The atomizer used delivers 20 ml. in the 30-second exposure period. The plants are held in a saturated atmosphere for 24 hours at 70° F. for early blight and 60° F. for late blight to permit spore germination and infection before removal to the greenhouse. After two days from the start of the test for early blight and three days for late blight, lesion counts are made on the three uppermost fully expanded leaves. The data are converted to percent disease control based on the number of lesions obtained on the control plants. Dosages and percent disease control are given in the following table:

| Compound | Dosage percent concentration | Percent disease control | |
|---|---|---|---|
| | | E. blight | L. blight |
| Dimethyl trichlorodipicolinate | 1,000 | 100 | 100 |

Example 34

Systemic bactericidal test.—Test formulations are examined for ability to control tomato crown gall (*Agrobacterium tumofaciens*). A test formulation containing 0.24 g. of the test chemical (or 0.24 ml. if a liquid), 4.0 ml. acetone, 2.0 ml. stock emulsifier solution (0.5% Triton X-155 in water by volume), and 94.0 ml. distilled water is prepared for both the soil drench and foliage spray treatments. Individual tomato plants, var. Rutgers, are planted in 3½-inch clay pots and are 3 to 5 inches tall at treatment time. Stem pucture inoculation, at the cotylodonary node, with a cellular suspension of the *Agrobacterium tumefaciens* is made one to two hours prior to the soil drench and foliage spray treatment.

In the soil drench treatment, the test formulation is applied at the soil surface of each pot; 17.5 ml. of the formulation being equivalent to a dosage of the test chemical of 64 pounds per acre with lower concentrations being achieved through dilution. Control is determined through visual observation of tumor formation 10 to 14 days after treatment. Using this procedure, the following results are obtained:

| Compound | Dosage, lbs./a. | Percent control |
|---|---|---|
| Monoammonium trichlorodipicolinate | 2 | 100 |
| | 1 | 100 |

It is to be understood that although the invention has been described with specific reference to particular embodiments thereof, it is not to be so limited since changes and alterations therein may be made which are within the full intended scope of this invention as defined in the appended claims.

What is claimed is:

1. A compound selected from the group consisting of trichlorodinicotinic acid, trichlorolutidinic acid, and 4-aminodichlorodipicolinic acid and the alkali metal salts, ammonium salts, and lower alkyl esters thereof.

2. 4-aminodichlorodipicolinic acid and the alkali metal salts, ammonium salt, and lower alkyl esters thereof.

3. A compound selected from the group of claim 1 which is trichlorolutidinic acid.

4. A compound selected from the group of claim 1 which is dipotassium trichlorolutidinate.

5. A compound selected from the group of claim 1 which is dipotassium trichlorodinicotinate.

6. A compound selected from the group of claim 1 which is monopotassium trichlorodinicotinate.

7. A compound selected from the group of claim 1 which is 4-amino-3,5-dichlorodipicolinic acid.

8. A compound selected from the group of claim 1 which is monopotassium 4-aminodichlorodipicolinate.

9. A compound selected from the group of claim 1 which is dipotassium 4-aminodichlorodipicolinate.

10. A compound selected from the group of claim 1 which is trichlorodinicotinic acid.

References Cited

Chambers et al.: Chem. Abstracts, vol. 63, 13,200-f (1965).

Wibaut et al.: Chem. Abstracts, vol. 27, p. 4542 (1933).

ALAN L. ROTMAN, Primary Examiner

U.S. Cl. X.R.

260—294.9, 295.5 R; 424—266; 71—94